UNITED STATES PATENT OFFICE.

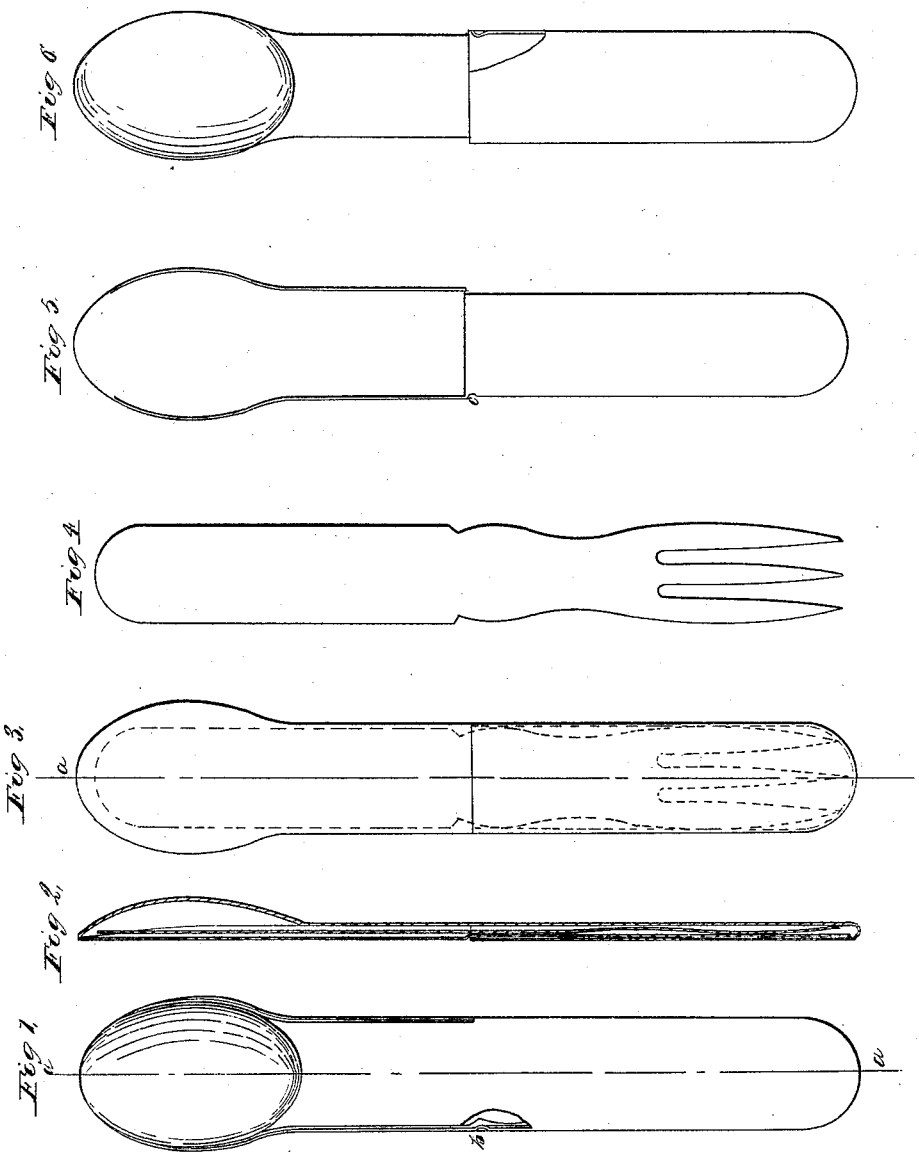

ARTHUR NEILL, OF BOSTON, MASSACHUSETTS.

IMPROVED COMBINED KNIFE, FORK, AND SPOON.

Specification forming part of Letters Patent No. 34,069, dated January 7, 1862.

*To all whom it may concern:*

Be it known that I, ARTHUR NEILL, of Boston, in the county of Suffolk and State of Massachusetts, have invented a new and Improved Combination of a Knife, Fork, and Spoon; and I do hereby declare that the following specification, taken in connection with the drawings which accompany and form part of the same, is a description of my said invention so full and exact as to enable others skilled in the art to practice it.

Figure 1 presents a view of the three implements as combined together for transit, with the convex side of the bowl of the spoon toward the beholder. Fig. 2 is a section taken in the line $a\,a$. (Seen in Figs. 1 and 3.) Fig. 3 is a view of the reverse side of the combination from that shown in Fig. 1. Figs. 4, 5, and 6 are, respectively, views of the fork, knife, and spoon as they appear when disconnected and ready for use.

My invention consists in the combination, in the manner substantially that shown and described, of a knife, fork, and spoon so constructed that either of the first-named implements shall, in conjunction with that last mentioned, form a suitable receptacle for either the knife or the fork.

The object of my invention is the same sought to be accomplished by similar combinations—viz., to provide a compact, serviceable, and portable combination of the said well-known implements, suitable for the use of soldiers, sailors, and others.

A peculiarity of my invention is that each implement of the combination is complete in itself for use in its appropriate function, no two of the implements being formed in one or designed to be united for personal use. Another peculiarity is that the fork (or, at pleasure of the constructor, it may be the knife) is completely inclosed in a case. When, as shown in the drawings, the fork is inclosed, the blade of the knife is completely protected in the sheath-like formation of the spoon-handle. This is most clearly illustrated in Fig. 2.

The sheath upon the spoon-handle, or forming the handle, is made of a capacity relative to the size of the blade of the knife and that end of the fork intended to be inserted therein. It may here be observed that the handle or the prongs of the fork may be inserted in the spoon-handle, when the reverse end of the fork will come within and will be protected by the bowl of the spoon. The knife is formed with an offset at the juncture of its blade and handle, as is best seen in Figs. 2 and 5, or, if formed without, the result will be a slight lessening of the space left for the fork-handle.

The handle of the knife is shaped to conform to the contour of the stem and bowl of the spoon, and is provided with flanges (see Fig. 5) which project sufficiently to encompass the edges of the stem and bowl of the spoon, though the flanges may be reduced from the juncture of the stem with the bowl till they disappear at or near the end of the knife-handle. A spring $b$ may be formed in or on the spoon-handle to catch in a notch $c$ in the knife, when combined, for the purpose of preventing accidental separation of the parts.

The fork is formed as shown in Figs. 2 and 4, or with such slight modifications as the combination will admit—as, for instance, the handle of the fork might be thicker than the prongs and yet pack well between the stem and bowl of the spoon and the handle of the knife.

The material and style of the implements may vary, as well as the manner of forming the case-like handle of the spoon, which may be formed out of and in one piece of the same sheet metal with the other parts thereof, and made to form the sheath by flanging and bending.

All the implements may be made, and probably best made, from sheet-steel, which may be plated with silver or tin to protect from rust.

Modifications of the form of the knife-handle, or dispensing with the flanges thereon, or the spring $b$, or changes in the form of the stem of the spoon, or the use of the fork outwardly in the place of the knife, and placing the knife where the fork is shown in the drawings, do not constitute any departure from the spirit of my invention.

It will be observed that my manner of combining the three implements is very compact and light, and that the disagreeable necessity which exists in some other combinations for the same purpose—viz., that of grasping alternately the used bowl of the spoon and the prongs of the fork—is by my invention entirely dispensed with.

I claim—

As a new article of manufacture, the combination made and operating substantially in the manner herein described—viz., the spoon formed with a case or protector sufficient to receive the fork and knife-blade, and the knife or fork so formed as to complete a suitable receptacle for the bestowal of the third implement.

Executed this 23d day of August, A. D. 1861.

ARTHUR NEILL.

In presence of—
J. B. CROSBY,
H. D. OSGOOD.